(12) United States Patent
Zhang et al.

(10) Patent No.: US 10,409,240 B2
(45) Date of Patent: Sep. 10, 2019

(54) METHOD OF CONTROLLING SELF-SERVICE WASHING MACHINE, AND TERMINAL AND SYSTEM UTILIZING SAME

(71) Applicant: Qingdao Haier Washing Machine Co., Ltd., Shandong (CN)

(72) Inventors: Tao Zhang, Shandong (CN); Sheng Xu, Shandong (CN); Zhenxing Huang, Shandong (CN); Feng Shi, Shandong (CN); Chunfeng Zhang, Shandong (CN)

(73) Assignee: Qingdao Haier Washing Machine Co., Ltd. (CN)

( * ) Notice: Subject to any disclaimer, the term of this patent is extended or adjusted under 35 U.S.C. 154(b) by 0 days.

(21) Appl. No.: 15/579,764

(22) PCT Filed: Dec. 16, 2015

(86) PCT No.: PCT/CN2015/097572
§ 371 (c)(1),
(2) Date: Dec. 5, 2017

(87) PCT Pub. No.: WO2016/206324
PCT Pub. Date: Dec. 29, 2016

(65) Prior Publication Data
US 2018/0173175 A1    Jun. 21, 2018

(30) Foreign Application Priority Data
Jun. 23, 2015 (CN) .......................... 2015 1 0349002

(51) Int. Cl.
*G05B 21/00* (2006.01)
*G01M 1/38* (2006.01)
(Continued)

(52) U.S. Cl.
CPC ............. *G05B 15/02* (2013.01); *D06F 39/00* (2013.01); *G06Q 10/02* (2013.01); *G07F 17/20* (2013.01)

(58) Field of Classification Search
CPC ........ G05B 15/02; D06F 39/00; G06Q 10/02; G07F 17/20
(Continued)

(56) References Cited

U.S. PATENT DOCUMENTS 7,418,521 B2 *  8/2008  Schroeder ............... D06F 33/02
                                                       340/3.1
8,766,795 B1    7/2014  Causey et al.
(Continued)

FOREIGN PATENT DOCUMENTS

CN       203457182 U     2/2014
CN       204298634 U     4/2015
(Continued)

OTHER PUBLICATIONS

European Search Report from related EP Application No. 15896207.6, dated Sep. 28, 2018.

*Primary Examiner* — Md Azad
(74) *Attorney, Agent, or Firm* — Burns & Levinson, LLP; Joseph M. Maraia

(57) ABSTRACT

Disclosed are a method of controlling a self-service washing machine, and a terminal and a system utilizing same. The method includes: outputting position information and state information of at least one peripheral washing machine; acquiring a target washing machine selected by a user; sending a reservation request to a server, wherein the reservation request includes a target time period and an identifier of the target washing machine input by the user so as to enable the server to schedule the target washing machine to provide a washing function for the user in the target time
(Continued)

period; and receiving and outputting a reservation result fed back by the server.

13 Claims, 15 Drawing Sheets

(51) Int. Cl.
  *G05B 13/00* (2006.01)
  *G05B 15/00* (2006.01)
  *G05D 23/00* (2006.01)
  *G05B 15/02* (2006.01)
  *G07F 17/20* (2006.01)
  *D06F 39/00* (2006.01)
  *G06Q 10/02* (2012.01)

(58) Field of Classification Search
  USPC .......................................................... 700/275
  See application file for complete search history.

(56) References Cited

U.S. PATENT DOCUMENTS

| | | | | |
|---|---|---|---|---|
| 2002/0010515 A1* | 1/2002 | Fukuoka | ............. | G06Q 20/027 700/9 |
| 2002/0065770 A1 | 5/2002 | Ebata | | |
| 2008/0125912 A1* | 5/2008 | Heilman | ............... | D06F 39/005 700/275 |
| 2012/0143708 A1* | 6/2012 | Viviano | ................. | G06Q 20/18 705/24 |
| 2014/0085109 A1* | 3/2014 | Stefik | ..................... | G06Q 10/02 340/932.2 |
| 2015/0262431 A1* | 9/2015 | Berman | ................. | G07B 15/02 705/13 |
| 2015/0286965 A1* | 10/2015 | Amano | ............. | G01C 21/3469 705/5 |

FOREIGN PATENT DOCUMENTS

| | | |
|---|---|---|
| CN | 104805638 A | 7/2015 |
| CN | 105133249 A | 12/2015 |
| EP | 2799609 A1 | 11/2014 |
| JP | 2003233740 A | 8/2003 |
| JP | 2005334150 A | 12/2005 |
| JP | 2005339046 A | 12/2005 |
| JP | 2006262942 A | 10/2006 |
| KR | 20130001645 A | 1/2013 |

* cited by examiner

METHOD OF CONTROLLING SELF-SERVICE WASHING MACHINE, AND TERMINAL AND SYSTEM UTILIZING SAME

CROSS REFERENCE TO RELATED APPLICATIONS

This application is the U.S. national phase entry under 35 U.S.C. § 371 of International Application No. PCT/CN2015/097572, filed Dec. 16, 2015, entitled METHOD OF CONTROLLING SELF-SERVICE WASHING MACHINE, AND TERMINAL AND SYSTEM UTILIZING SAME, which claims priority to Chinese Patent Application No. 201510349002.6, filed Jun. 23, 2015, the contents of which are incorporated herein by reference in their entirety for all purposes.

TECHNICAL FIELD

The present disclosure relates to a control technology of an electrical appliance, and particularly relates to a method of controlling a self-service washing machine, and a terminal and a system utilizing same.

BACKGROUND

With the rapid development of technologies of washing machines, a public self-service washing machine is gradually popularized. A user can throw own clothes into the self-service washing machine. After payment is completed in a coin inserting or card swiping mode, the self-service washing machine automatically washes clothes thrown by the user. After washing is completed, the user takes out the clothes from the washing machine, thereby realizing self-service washing.

However, with the gradual increase of the number of users using the self-service washing machine, when the user arrives at the self-service washing machine, since the self-service washing machine may be used by other users or may be damaged, the user cannot use the self-service washing machine. At this moment, the user needs to seek other self-service washing machines again or needs to wash the clothes personally, causing a problem of inconvenient use of the user.

SUMMARY

The present disclosure provides a method of controlling a self-service washing machine, and a terminal and a system utilizing same, so that a user can know an operation state of the washing machine before clothes are delivered to the washing machine, so as to ensure that the washing machine can provide a self-service washing function for the user when the user takes the clothes to the washing machine.

In a first aspect, embodiments of the present disclosure provide a method of controlling a self-service washing machine, applied to the terminal, including:

outputting position information and state information of at least one peripheral washing machine;

acquiring a target washing machine selected by a user;

sending a reservation request to a server, wherein the reservation request includes a target time period and an identifier of the target washing machine input by the user so as to enable the server to schedule the target washing machine to provide a washing function for the user in the target time period; and receiving and outputting a reservation result fed back by the server.

In a second aspect, embodiments of the present disclosure further provide a method of controlling a self-service washing machine, applied to a server including:

receiving a reservation request sent by a terminal, wherein the reservation request includes a target time period and an identifier of the target washing machine input by the user;

sending reservation success information to the terminal if the target washing machine is in an idle state in the target time period; and sending control information to the target washing machine, wherein the control information is used for controlling the target washing machine to provide a washing function for the user in the target time period.

In a third aspect, embodiments of the present disclosure further provide a method of controlling a self-service washing machine, applied to a target washing machine, including:

receiving control information sent by a server, wherein the control information includes a target time period; and washing clothes thrown by a user within the target time period.

In a fourth aspect, embodiments of the present disclosure further provide a terminal, including:

a washing machine position information output unit, configured to output position information and state information of at least one peripheral washing machine;

a target washing machine acquiring unit configured to acquire a target washing machine selected by a user;

a reservation request sending unit configured to send a reservation request to a server, wherein the reservation request includes a target time period and an identifier of the target washing machine input by the user so as to enable the server to schedule the target washing machine to provide a washing function for the user in the target time period;

a reservation result receiving unit configured to receive a reservation result fed back by the server; and a reservation result output unit configured to output the reservation result received by the reservation result receiving unit.

In a fifth aspect, embodiments of the present disclosure further provide a server, including:

a reservation request receiving unit configured to receive a reservation request sent by a terminal, wherein the reservation request includes a target time period and an identifier of a target washing machine input by a user;

a reservation result sending unit configured to send reservation success information to the terminal if the target washing machine is in an idle state in the target time period; and a control information sending unit configured to send control information to the target washing machine, wherein the control information is used for controlling the target washing machine to provide a washing function for the user in the target time period.

In a sixth aspect, embodiments of the present disclosure further provide a washing machine, which is a target washing machine, including:

a control information receiving unit configured to receive control information sent by a server, wherein the control information includes a target time period; and a washing unit configured to wash clothes thrown by a user within the target time period.

In a seventh aspect, embodiments of the present disclosure further provide a system of controlling a self-service washing machine, including the terminal described in the fourth aspect, the server described in the fifth aspect and at least one washing machine described in the sixth aspect.

In embodiments of the present disclosure, the user selects one washing machine from the position information, output by the terminal, of at least one peripheral washing machine as the target washing machine; then, the terminal sends a reservation request to the server; and if reservation is successful, the server schedules the target washing machine to provide a washing function for the user in the target time period input by the user. In an existing art, when the user arrives at the self-service washing machine, since the self-service washing machine may be used by other users or may be damaged, the user cannot use the self-service washing machine. Compared with this, before the user arrives at the self-service washing machine, the washing machine can be reserved through the terminal in the present disclosure. If reservation is successful, the user can use the washing machine for self-service washing in the reserved target time period, thereby facilitating use of the user and increasing efficiency of self-service washing.

DETAILED DESCRIPTION

The present disclosure is further described below in detail in combination with drawings and embodiments. It can be understood that specific embodiments described herein are only used for explaining the present disclosure, not limiting the present disclosure. It should also be noted that to facilitate description, drawings only show some structures relevant to the present disclosure, not all of the structures.

Embodiment I

Figure 1:
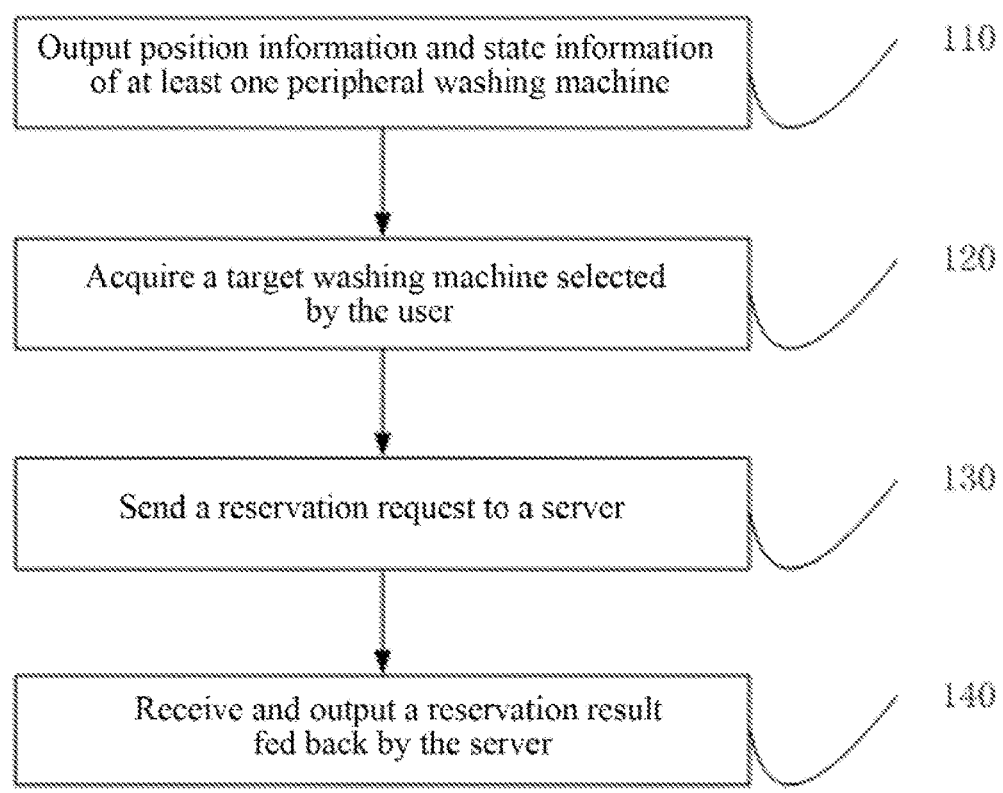
FIG. 1 is a flow chart illustrating a method of controlling a self-service washing machine in embodiment I of the present disclosure.

FIG. 1 is a flow chart illustrating a method of controlling a self-service washing machine provided in embodiment I of the present disclosure. The present embodiment is applicable to a condition that the self-service washing machine is reserved by a user through a terminal. The method can be executed by the terminal and specifically includes following steps.

In step 110, position information and state information of at least one peripheral washing machine are output.

The position information is coordinate information of the washing machine. The coordinate information is recorded by a structure of latitude and longitude. The state information includes: an operation state, a fault state or an idle state. The operation state indicates that the washing machine is in a process of washing currently. The fault state indicates that the washing machine has fault currently. The idle state indicates that the washing machine is idle currently.

At least one washing machine can be all washing machines around the terminal, can be a washing machine which only displays a preset distance (e.g., 500 meters or 1 kilometer) away from a current position of the terminal and can further display according to a function of the washing machine (e.g., a washing machine capable of performing dewatering or capable of performing steam washing).

A mode of outputting the position information of the washing machine may be a tabular mode for displaying, and can also be a mode of displaying an icon of the washing machine in a map according to a corresponding region of the coordinate of the washing machine. Further, number and positions of the washing machines around the user can also be prompted through a voice broadcast mode.

In step 120, a target washing machine selected by the user is acquired.

The user selects a target washing machine from at least one output washing machine through clicking and other modes. The target washing machine is the washing machine desired by the user to wash clothes.

In step 130, a reservation request is sent to a server.

The reservation request includes a target time period and an identifier of the target washing machine input by the user so as to enable the server to schedule the target washing machine to provide a washing function for the user in the target time period.

The target time period is used for indicating a time period desired to use the target washing machine by the user. After the user selects the target washing machine, the user can set a selected moment as a starting time of the target time period, and determine a sum of the starting time and a preset duration (e.g., 30 minutes) as an end time of the target time period. A reservation conducted at this moment can be called as an instant reservation. Or an input prompt interface of the target time period is displayed; the starting time and the end time input by the user are received; and the target time period is determined according to the starting time and the end time.

In step 140, a reservation result fed back by the server is received and output.

If reservation success information fed back by the server is received, reservation success prompt information is output, such as "please go to a selected washing machine within preset time if reservation succeeds" and the like.

If reservation failure information fed back by the server is received, reservation failure prompt information is output, such as "reservation fails, please reserve again" and the like.

Through a technical solution supplied in embodiments of the present disclosure, before the user arrives at the self-service washing machine, the washing machine can be reserved through the terminal. If reservation is successful, the user can use the washing machine for self-service washing in the reserved target time period, thereby facilitating use of the user and increasing efficiency of self-service washing.

Embodiment II

Figure 2:
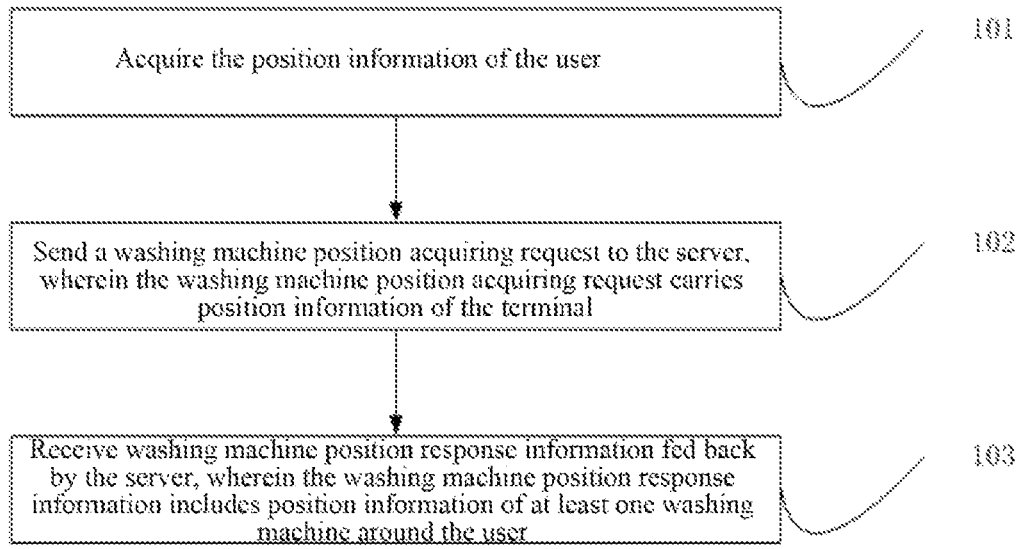
FIG. 2 is a flow chart illustrating a first method of controlling a self-service washing machine in embodiment II of the present disclosure.

The terminal can acquire the position information of a peripheral washing machine through a third party application (e.g., an electronic map and the like). When the third party reference cannot support acquirement of the position information of the washing machine, embodiments of the present disclosure provide a method of controlling a self-service washing machine. As a further description of embodiment I, as shown in FIG. 2, before the position information and the state information of at least one peripheral washing machine are output in step 110, the method further includes following steps.

In step 101, the position information of the user is acquired.

The position information of the user can be acquired through positioning software, such as Global Positioning System (GPS). Location Based Services (LB S) can be used. The LBS is to acquire the position information (a geographic coordinate or a geodetic coordinate) of a mobile terminal user through a radio communication network (such as a GSM network and a CDMA network) of a telecommunication mobile operator or an external positioning mode (such as a Global Positioning System (GPS)). Under support of a Geographic Information System (GIS) platform, a value added service of a corresponding service is provided for the user.

In step 102, a washing machine position acquiring request is sent to the server, wherein the washing machine position acquiring request carries position information of the terminal.

When one washing machine is arranged, the server records the position information of the washing machine. If the terminal wants to acquire a condition of a peripheral washing machine, the condition can be inquired through the server. After the terminal sends the position information to the server through the position acquiring request, the server seeks the information of the washing machine around the position information.

In step 103, washing machine position response information fed back by the server is received, wherein the washing machine position response information includes position information of at least one washing machine around the user.

After the terminal sends the washing machine position acquiring request, the terminal listens the washing machine position response information fed back by the server. If the washing machine position response information is listened, the washing machine position response information is decoded to obtain the carried position information of at least one washing machine for subsequent output.

Through a technical solution supplied in embodiments of the present disclosure, the position information of at least one washing machine around the terminal is acquired through the server, so as to output the position information subsequently. The acquirement of the position information of the washing machine through the server is not affected by the third party application, thereby enhancing reliability of acquiring the position information of the washing machine.

Figure 3:
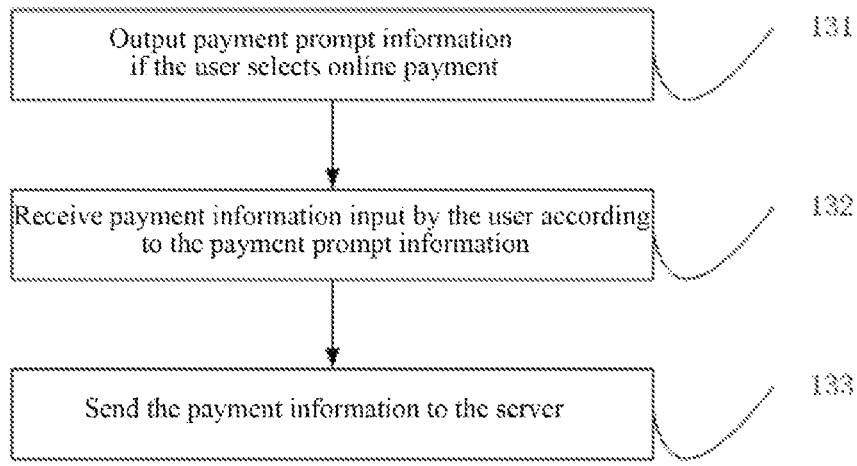
FIG. 3 is a flow chart illustrating a second method of controlling a self-service washing machine in embodiment II of the present disclosure.

To acquire a use right of the washing machine, the user needs to pay to acquire the use right of the washing machine in addition to reserving the target washing machine. A payment mode includes online payment and card swiping payment. The payment mode is displayed to select a dialog box so as to prompt the user to select the payment mode. Embodiments of the present disclosure provide a method of controlling a self-service washing machine which supports online payment. The card swiping payment will be described in detail subsequently. As shown in FIG. 3, after a reservation request is sent to a server in step 130, the method further includes following steps.

In step 131, payment prompt information is output if the user selects online payment.

The payment prompt information is, for example: please input a payment account and payment password. A payment process can refer to an existing technical solution, and is described through one realization mode herein. Any technical solution which can realize remote payment can be applied to the present solution.

In step 132, payment information input by the user according to the payment prompt information is received.

The payment prompt information is, for example, input payment account and payment password.

In step 133, the payment information is sent to the server.

Through a technical solution supplied in embodiments of the present disclosure, a use right of the target washing machine can be paid through the terminal, thereby ensuring exclusiveness of the washing machine (available for a paying user only) and enhancing use safety of the user.

During use, an inventor discovers that if only the position information of the peripheral washing machine is provided for the user, the following problems may exist: the washing machine only supports rinsing, and does not support drying; the user just needs to dry the clothes; and at this moment, the user finds that the washing machine cannot perform drying after using the self-service washing machine, bringing inconvenience for the user. Or the user only hopes to pay for renminbi ("RMB") 5 to perform self-service washing, but the use fee of the washing machine is RMB 10; the user pays on a premise of not knowing the use fee of the washing machine; and a fee beyond a user expectation appears during payment. Based on this, embodiments of the present disclosure further provide a method of controlling a self-service washing machine. As a further description of above embodiments, before a reservation request is sent to a server in step 130, the above method further includes:

at least one of the following information of at least one peripheral washing machine is acquired and output: function information and price information.

The function information means functions which can be executed by the washing machine, such as rinsing, drying, steam washing and the like. The function information further includes washing modes combined with multiple functions, e.g., daily washing (such as rinsing and drying for a total of 40 minutes), ultrafast washing (such as rinsing and drying for a total of 17 minutes) and the like. The price information is price corresponding to various functions. Individual functions such as rinsing, drying and the like are charged according to minutes, such as RMB 1 per minute for rinsing. A combination of multiple functions is charged according to times, such as RMB 15 per time for daily washing.

Through a technical solution supplied in the present embodiment, before the user selects the target washing machine, the function information and the price information of various washing machines are provided for the user, so that the user can select the target washing machine after clearly knowing the position, the state, the function and the price of the washing machines, thereby enhancing effectiveness of the target washing machine.

Figure 4:
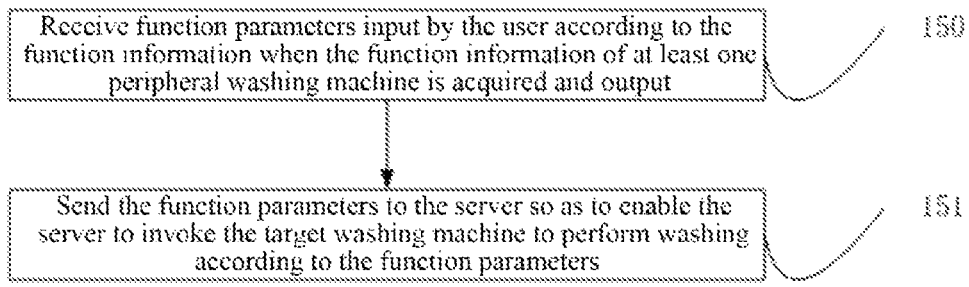
FIG. 4 is a flow chart illustrating a third method of controlling a self-service washing machine in embodiment II of the present disclosure.

Further, after the user outputs function parameters of the washing machine, the user can make reservation according to a use need of the user through the terminal. For example, after half an hour from reservation, the target washing machine is configured to dewater for 10 minutes. To achieve an above effect, embodiments of the present disclosure further provide a method of controlling a self-service washing machine. As a further description of above embodiments, as shown in FIG. 4, the shown method further includes following steps.

In step 150, function parameters input by the user according to the function information are received when the function information of at least one peripheral washing machine is acquired and output.

The function parameters are used for controlling the target washing machine to perform washing. The function parameters include a function identifier and a use time period corresponding to the function.

The user can divide the target time period into a plurality of use time periods. Each time period corresponds to one function. For example, the target time period is 1 hour; and the user can set washing for 20 minutes, drying for 5 minutes and steam washing for 30 minutes.

In step 151, the function parameters are sent to the server so as to enable the server to invoke the target washing machine to perform washing according to the function parameters.

The server forwards the function parameters sent by the terminal to the target washing machine through a communication channel among the rest target washing machines, so as to enable the target washing machine to perform washing according to the function parameters.

Through a technical solution supplied in the present embodiment, the user can set working contents of the target washing machine within the target time period through the function parameters, so as to enable the self-service washing machine to perform self-service washing according to a use-only need of the user, thereby enhancing user experience.

Figure 5:
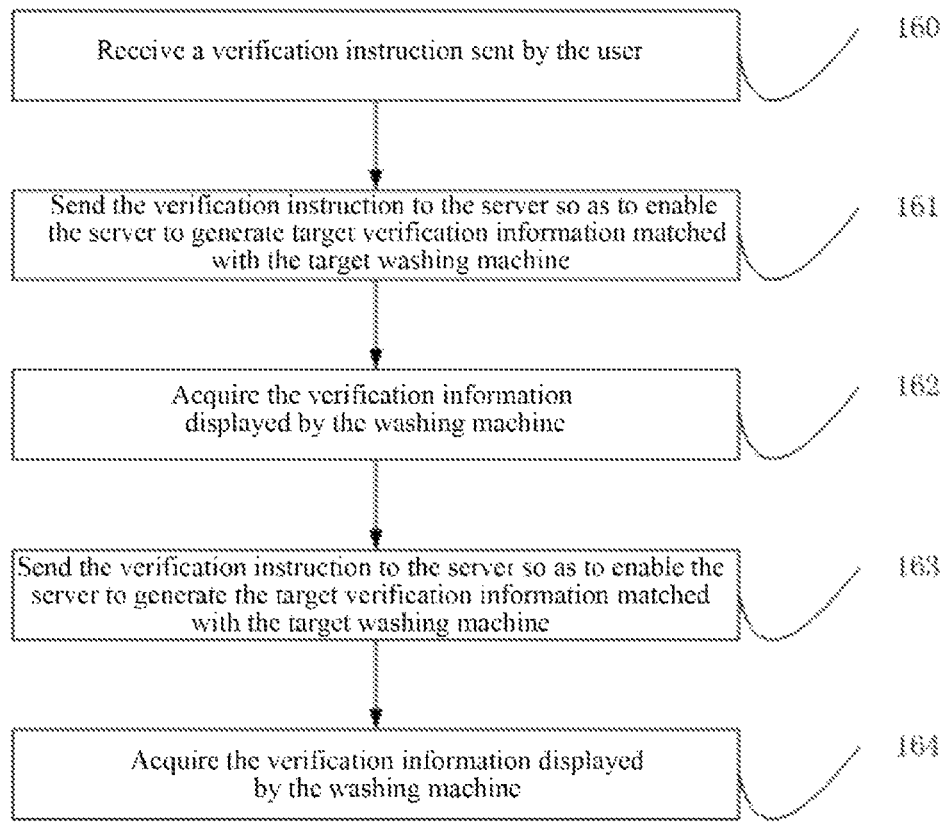
FIG. 5 is a flow chart illustrating a fourth method of controlling a self-service washing machine in embodiment III of the present disclosure.

With the increase of the number of users of the self-service washing machine, to realize centralized washing, a plurality of self-service washing machines are configured in a same place. At this moment, the target washing machine reserved by the user cannot be accurately identified according to the position information displayed in a map. Based on this, embodiments of the present disclosure further provide a method of controlling a self-service washing machine. As a further description of above embodiments, as shown in FIG. 5, after a reservation result fed back by the server is received and output in step 140, the method further includes following steps.

In step 160, a verification instruction sent by the user is received.

The verification instruction is used for determining whether the self-service washing machine found by the user is the target washing machine after the user makes reservation.

In step 161, the verification instruction is sent to the server so as to enable the server to generate target verification information matched with the target washing machine.

The user sends the verification instruction to the server through the terminal so as to enable the server to know that the user needs to confirm whether the self-service washing machine found by the user is the target washing machine. After the server receives the verification instruction, a target display is controlled to display the verification information.

In step 162, the verification information displayed by the washing machine is acquired.

If the user can seek the washing machine which displays the verification information around the user, when more than one washing machine displays the verification information at this moment, then each washing machine is subjected to the following operation respectively: the verification information displayed on the washing machine is acquired through image acquisition functions of the terminal, such as a two-dimensional code identification function, a bar code identification function and the like. Optionally, if the verification information is text information, when a user name of the user and the like is displayed, then the verification information can be manually read by the user and the verification information is input into the terminal. At this moment, the terminal acquires the verification information displayed by the washing machine.

In step 163, the verification information is sent to the server so as to enable the server to verify whether the verification information is matched with the target washing machine.

In step 164, a verification result fed back by the server is received.

If the washing machine from which the verification information is acquired is the target washing machine, then the acquired verification information is the same as target verification information generated in the server. At this moment, the server feeds back the verification success information. Otherwise, the server feeds back the verification failure information. If the verification failure information is fed back, the user continues to seek other washing machines which display the verification information to perform verification.

Through a technical solution supplied in the present embodiment, the user can be helped to determine whether the found washing machine is the target washing machine, thereby avoiding that the user misuses or cannot use the washing machine and enhancing reliability of self-service washing.

Embodiment III

Figure 6:
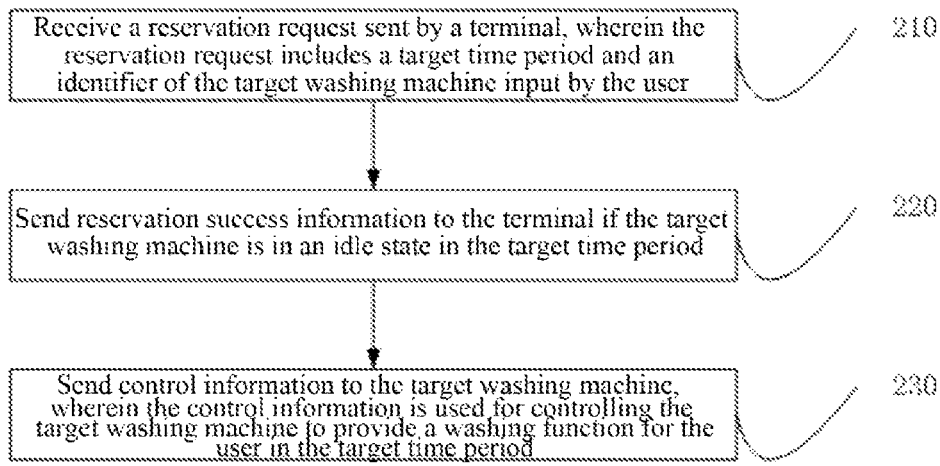
FIG. 6 is a flow chart illustrating a method of controlling a self-service washing machine in embodiment III of the present disclosure.

FIG. 6 is a flow chart illustrating a method of controlling a self-service washing machine provided in embodiment III of the present disclosure. In the present embodiment, the method can be executed by the server, and specifically includes following steps.

In step 210, a reservation request sent by a terminal is received, wherein the reservation request includes a target time period and an identifier of the target washing machine input by the user.

In step 220, reservation success information is sent to the terminal if the target washing machine is in an idle state in the target time period.

The server judges whether the target time period of the target washing machine is in the idle state. The state of the washing machine includes: a fault state, a working state and an idle state. if the washing machine is reserved by the user, reserved information of the washing machine is also recorded in the server. For example, the washing machine A is reserved by a user A1 in a time period a1 (such as 10:00-10:30), and is reserved by a user A2 in a time period a2 (such as 14:00-15:00). If the target time period carried in a reservation request is overlapped with a time period that the target washing machine is reserved, the target washing machine is not idle in the target time period. If the current state of the target washing machine is the fault state, it is impossible to ensure that the target washing machine can return to normal within the target time period. Therefore, a state of the target washing machine after the current moment is determined as a non-idle state, i.e., the fault state.

In step 230, control information is sent to the target washing machine, wherein the control information is used for controlling the target washing machine to provide a washing function for the user in the target time period.

The control information carries a control identifier, a target time period and a user identifier, so that the target washing machine can provide washing for the user corresponding to the user identifier in the target time period after determining the information as the control information.

Through a technical solution supplied in the present embodiment, the server can verify the state of the target washing machine after receiving the reservation request sent by the terminal. If the target washing machine is idle in the target time period, the target washing machine is controlled to provide a washing function for the user in the target time period so that the user can reserve the target washing machine. Moreover, if reservation is successful, the user can acquire a use permission of the target washing machine in the target time period, thereby enhancing reliability of self-service washing and enhancing user experience.

Embodiment IV

Figure 7:
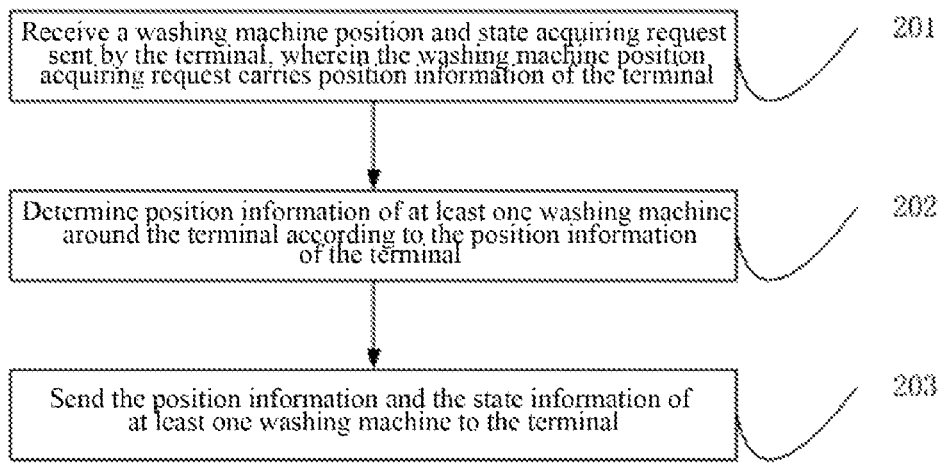
FIG. 7 is a flow chart illustrating a first method of controlling a self-service washing machine in embodiment IV of the present disclosure.

To provide the position information and the state information of various washing machines for the terminal, embodiments of the present disclosure further provide a method of controlling a self-service washing machine. As a further description of above embodiments, as shown in FIG. 7, before the reservation request sent by the terminal is received in step 210, the method further includes following steps.

In step 201, a washing machine position and state acquiring request sent by the terminal is received, wherein the washing machine position acquiring request carries position information of the terminal.

In step 202, position information of at least one washing machine around the terminal is determined according to the position information of the terminal.

A distance from each washing machine to the terminal is calculated respectively. The position information of all the washing machines can be sent to the terminal; and the position information can be sequenced according to distances, and the position information of at least one washing machine with a distance less than a preset distance (such as 500 meters or 100 meters and the like) is sent to the terminal.

In step 203, the position information and the state information of at least one washing machine are sent to the terminal.

The state information of each washing machine in at least one washing machine determined in step 202 is acquired. The position information and the state information of the at least one washing machine are sent to the terminal.

Through a technical solution supplied in the present embodiment, the server can send the position information of at least one washing machine to the terminal according to the washing machine position and state acquiring request sent by the terminal, so as to enable the terminal to provide the position information and the state information of the peripheral washing machine for the user, thereby acquiring the position information of each washing machine by the terminal without third party software and enhancing reliability of displaying the position information.

Figure 8:
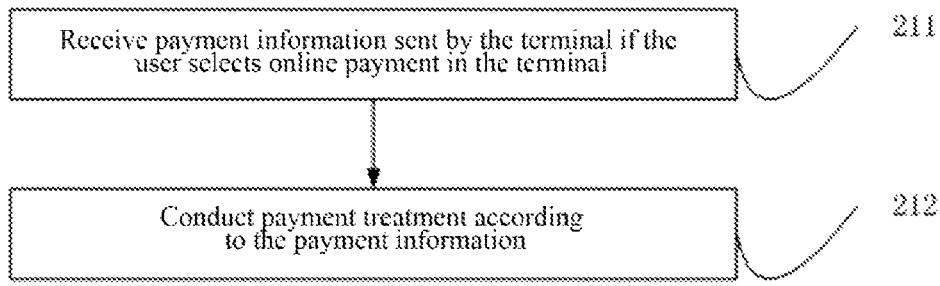
FIG. 8 is a flow chart illustrating a second method of controlling a self-service washing machine in embodiment IV of the present disclosure.

The user may not pay since the user has no cash or an integrated circuit (IC) card is demagnetized or other reasons. At this moment, even if an idle washing machine exists, the user still cannot use the idle washing machine. Based on this, embodiments of the present disclosure further provide a method of controlling a self-service washing machine. As a further description of above embodiments, as shown in FIG. 8, before reservation success information is sent to the terminal if the target washing machine is in an idle state in the target time period in step 220, the method further includes following steps.

In step 211, payment information sent by the terminal is received if the user selects online payment in the terminal.

In step 212, payment treatment is conducted according to the payment information.

In a realization mode, the payment treatment carries a payment account and payment password. The server checks legality and correctness of the payment account and the payment password. If the payment account and the payment password are legitimate and correct, fee is deducted from the payment account. If a remaining balance on the account is greater than a deducted amount, the fee is deducted and fee deduction success is determined.

Through a technical solution supplied in the present embodiment, the server can treat the payment information sent by the terminal so that the user can remotely reserve and pay for the target washing machine through the terminal and the server to determine the use right, to enable the user to pay through a network payment mode.

When the user can pay through an IC card, the following mode can be used for paying. Before reservation success information is sent to the terminal if the target washing machine is in an idle state in the target time period in step 220, the method further includes:

if the user selects a card swiping payment mode in the terminal, an identifier of a target card associated with the user is sent to the target washing machine.

Since the user directly goes to the target washing machine to perform card swiping payment (generally, an IC card is used for paying), the server needs to send an identifier of a target card associated with the user to the target washing machine so as to enable the target washing machine to determine whether a card swiping user is the user reserving the target washing machine according to the identifier of the target card.

Through a technical solution supplied in the present embodiment, when the user selects the card swiping payment, the server notifies the target washing machine of the identifier of the target card associated with the user so that the user can pay through the IC card. Further, more payment modes can be provided for the user, so that the user can go to the target washing machine to perform card swiping payment when the user cannot perform network payment, thereby enhancing user experience.

If the terminal provides the function information and the price information of the peripheral washing machine for the user in addition to the state information and the position information of the peripheral washing machine for the user, correspondingly, before the reservation request sent by the terminal is received in step 210, the method further includes:

the position information of at least one washing machine in a target region and at least one of the following information are acquired: function information and price information.

The function information of the washing machine can be sent to the server by the washing machine, and the function information of the washing machine can also be inquired by the server through Internet. The price information is determined according to factors such as functions supplied by the washing machine, a brand of the washing machine and the like. Specific price can be determined according to a use need, and can also be uniformly determined without referring to the factors of the function information, the brand and the like of the individual washing machine.

Through a technical solution supplied in the present embodiment, the server can acquire the function information and/or the price information of the washing machine. Further, the user can acquire the function information and/or the price information of each washing machine from the server through the terminal, so that the user can accurately select the target washing machine suitable for the need of the user.

Figure 9:
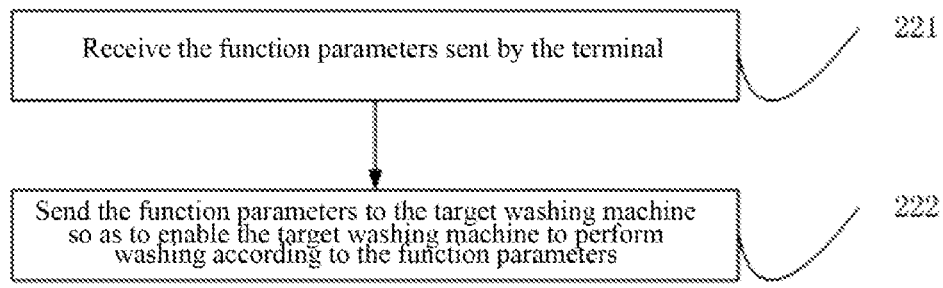
FIG. 9 is a flow chart illustrating a third method of controlling a self-service washing machine in embodiment IV of the present disclosure.

After the terminal outputs function parameters of all the washing machines for the user, the user can generate a need of customizing specific washing contents according to the function parameters. Based on this, embodiments of the present disclosure further provide a method of controlling a self-service washing machine. As a further description of above embodiments, as shown in FIG. 9, before control information is sent to the target washing machine in step 230, the method further includes following steps.

In step 221, the function parameters sent by the terminal are received.

In step 222, the function parameters are sent to the target washing machine so as to enable the target washing machine to perform washing according to the function parameters.

Through a technical solution supplied in the present embodiment, the user can perform customization according to the function parameters, and send a customization result to the server in a manner of the function parameters. The server forwards the function parameters to the target washing machine, and then controls the target washing machine to perform washing according to the function parameters, so that the user can remotely customize a washing process.

Figure 10:
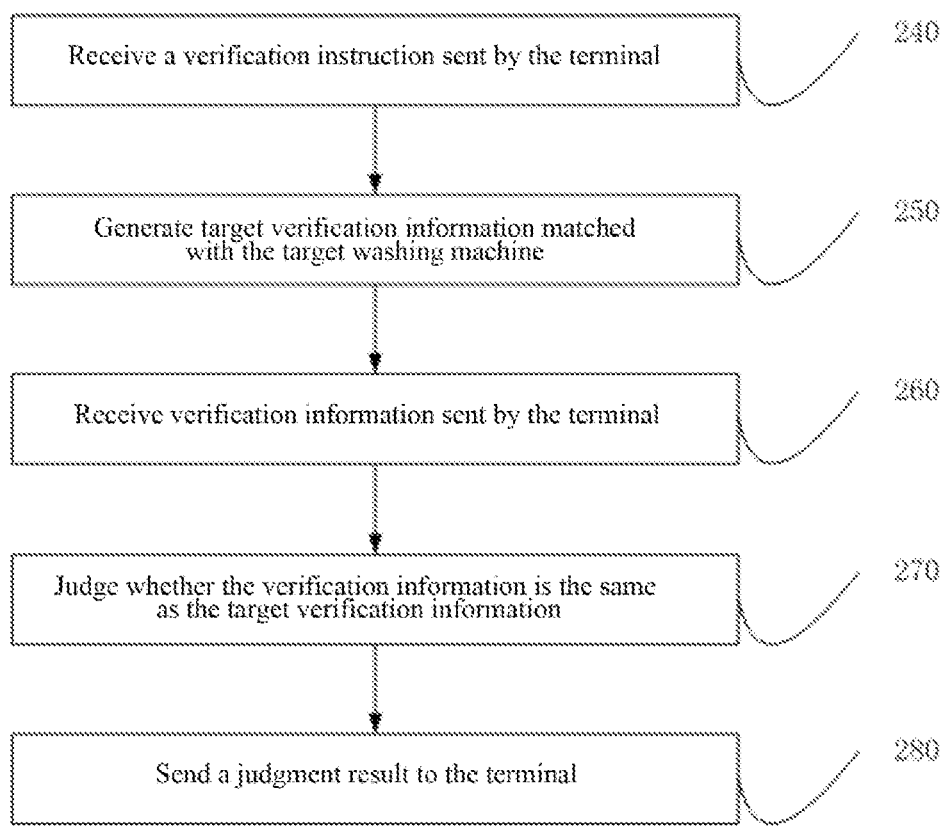
FIG. 10 is a flow chart illustrating a fourth method of controlling a self-service washing machine in embodiment IV of the present disclosure.

When a plurality of self-service washing machines are placed centrally, to enable the user to find the washing machine reserved by the user, embodiments of the present disclosure further provide a method of controlling a self-service washing machine. As shown in FIG. 10, before control information is sent to the target washing machine in step 230, the method further includes following steps.

In step 240, a verification instruction sent by the terminal is received.

In step 250, target verification information matched with the target washing machine is generated.

The target verification information can be generated according to the washing machine identifier of the target washing machine. For example, the target verification information corresponding to the washing machine identifier is calculated through a predetermined formula.

In step 260, verification information sent by the terminal is received.

In step 270, whether the verification information is the same as the target verification information is judged.

If the received verification information is the same as the target verification information generated in step 250, verification is successful. Otherwise, if not identical, verification fails.

In step 280, a judgment result is sent to the terminal.

Through a technical solution supplied in the present embodiment, the server can compare the verification information sent by the user with the target verification information, and then help the user to determine whether the found washing machine is the reserved target washing machine, so that the user can find a correct washing machine to perform washing.

Embodiment V

Figure 11:
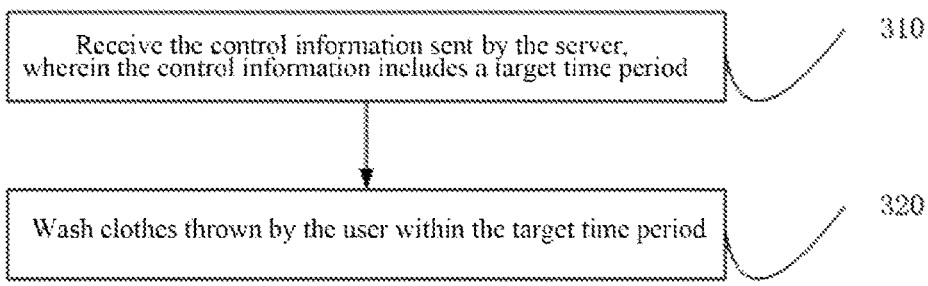
FIG. 11 is a flow chart illustrating a method of controlling a self-service washing machine in embodiment V of the present disclosure.

Embodiments of the present disclosure provide a method of controlling a self-service washing machine. The method is applied to the target washing machine. In the present embodiment and other embodiments, each washing machine includes a card swiping module and a computer control board. The computer control board is configured to send and receive data, and control the card swiping module and a washing component to work. In the washing machine, only the computer control board has a data processing capability. Therefore, steps related to data processing (including data receiving and sending, data comparison and confirmation) of the washing machine in the present disclosure can be considered as processing steps of the computer control board of the washing machine. As shown in FIG. 11, the method includes following steps.

In step 310, the control information sent by the server is received, wherein the control information includes a target time period.

In step 320, clothes thrown by the user are washed within the target time period.

During washing, washing can be performed according to a washing parameter set by the user on the target washing machine, and can also be performed according to the function parameters sent by the server.

Through a technical solution supplied in the present embodiment, the target washing machine can provide a washing function for the user in the target time period according to the control information sent by the server.

Embodiment VI

Figure 12:
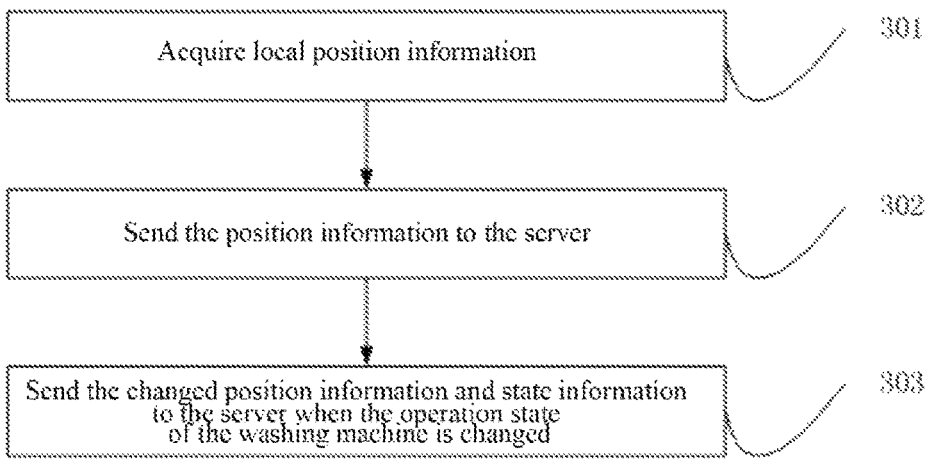
FIG. 12 is a flow chart illustrating a method of controlling a self-service washing machine in embodiment VI of the present disclosure.

Embodiments of the present disclosure provide a method of controlling a self-service washing machine. As a further description of above embodiments, as shown in FIG. 12, before the control information sent by the server is received in step 310, the method further includes following steps.

In step 301, local position information is acquired.

The local (washing machine) position information can be manually input into the washing machine when the washing machine is configured. Or, a GPS positioning module is added to the washing machine. The GPS positioning module can perform positioning to obtain the position information of the washing machine. The position information is information composed of a longitude and a latitude.

In step 302, the position information is sent to the server.

In step 303, when the operation state of the washing machine is changed, the changed position information and state information are sent to the server.

The change of the operation state includes change of a position of the washing machine and change of a washing state of the washing machine. If the washing machine is moved or migrated, the washing machine needs to report a new position to the server and then the server can know a position of the migrated washing machine. If the washing machine fails during washing, and a state of the washing machine is changed from a working state to a fault state, then the washing machine sends a changed state (the fault state) to the server so as to enable the server to make adjustment to prevent the user from reserving the failed washing machine. After the fault is eliminated, the washing machine sends a working state or an idle state to the server, so as to enable the server to know that the fault of the washing machine is eliminated and new reservation can be received.

Through a technical solution supplied in the present embodiment, the server can be notified when the operation state of the washing machine is changed, so as to enable the server to notify the user of the operation state of the reserved washing machine in time, thereby enhancing reservation reliability.

Embodiments of the present disclosure further provide a method of controlling a self-service washing machine. Before the clothes thrown by the user are washed within the target time period in step 320, any one of the following steps can be executed:

1. The function parameters sent by the server are received, and washing is performed according to the function parameters.

2. The function parameters input into the target washing machine by the user are received, and washing is performed according to the function parameters.

When the function parameters sent by the server are received, the user can remotely set the function parameters through the terminal.

When the function parameters input by the user locally are received, and when a distance from the user to the washing machine is short or network speed is slow, the function parameters are directly input into the target washing machine by the user and then a setting mode of the function parameters is enriched, thereby enhancing user experience.

Figure 13:
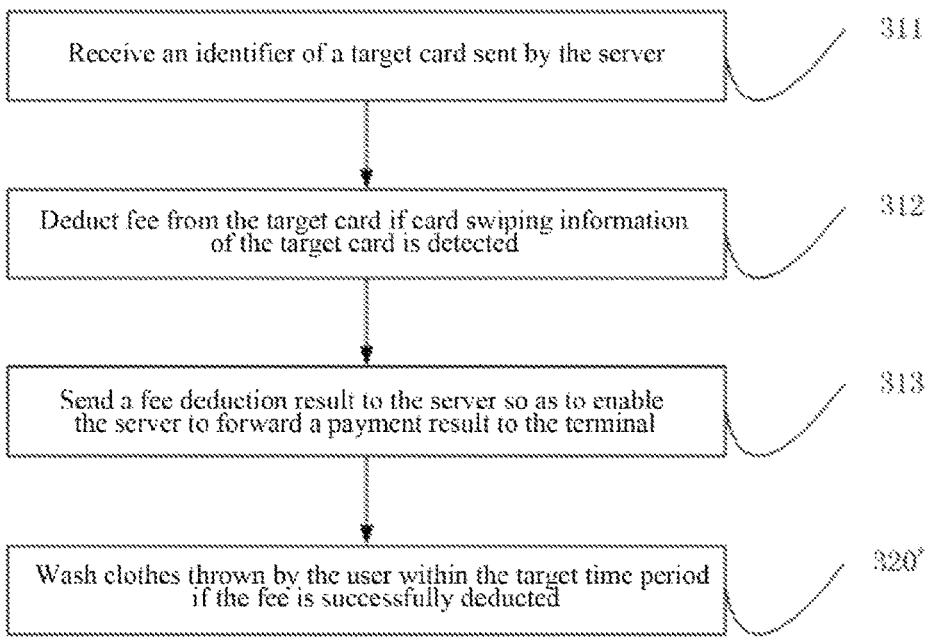
FIG. 13 is a flow chart illustrating an another method of controlling a self-service washing machine in embodiment VI of the present disclosure.

Further, if the user selects the card swiping payment, the target washing machine can implement through the following modes. As shown in FIG. 13, after the control information sent by the server is received in step 310, the method further includes following steps.

In step 311, an identifier of a target card sent by the server is received.

In step 312, fee is deducted from the target card if card swiping information of the target card is detected.

In step 313, a fee deduction result is sent to the server so as to enable the server to forward a payment result to the terminal.

Correspondingly, the clothes thrown by the user are washed within the target time period in step 320, which can be implemented through the following mode.

In step 320, the clothes thrown by the user are washed within the target time period if the fee is successfully deducted.

Through a technical solution supplied in the present embodiment, the user can realize card swiping payment in the target washing machine under a condition that the network speed is bad or the distance from the user to the target washing machine is too short, thereby increasing efficiency of self-service washing.

Above embodiments are specifically described below through several use scenarios:

Scenario 1:

The user logs on software of managing the self-service washing on the terminal. A software user realizes the methods in embodiment I and embodiment II: a nearby washing machine is inquired through an LBS map; the user clicks one washing machine to view related information of the washing machine, wherein the related information includes: the position information of the washing machine, the function information of the washing machine, washing price, the operation state, the fault state, idle state and the like. If the washing machine is in the idle state, the user determines to make reservation. At this moment, the washing machine is the target washing machine. The target time period to use the target washing machine by the user is input during reservation. After the user succeeds in instant reservation, the server sends the reservation success information to the user and sends the control information to the target washing machine. As a realization mode, after the washing machine receives the control information sent by the server, the card swiping module of the washing machine is controlled to be unavailable to indicate that the machine is remotely reserved and cannot be reserved through card swiping. As another realization mode, after the washing machine receives the control information sent by the server, the card swiping module of the machine is controlled to be unavailable in the target time period. Meanwhile, the user needs to put the clothes into the washing machine within the specified time (or a reserved target time period), and after online payment of the fee of the washing machine is successful, the server controls the washing machine to start washing, wherein the specified time is set in a system background by an operator according to a service range of the washing machine. A specified time ensures that the user has enough time to take the clothes near the washing machine and put the clothes into the washing machine and completes online payment. If the specified time comes and the user still does not perform online payment, the system automatically cancels reservation operation of the user and sets the washing machine as the idle state; and the washing machine sets the card swiping module as an available state.

After operation of the washing procedure is ended, the washing machine is automatically changed to the idle state and the card swiping module of the washing machine is changed to the available state. Meanwhile, the state is reported to the server and the washing machine can be remotely reserved by a mobile phone client.

After the washing machine fails, fault information can be automatically sent to the server and the fault information can also be directly sent to the operator and after-sales service personnel so as to perform timely treatment. The user can see the fault state of the washing machine and cannot perform instant reservation and reservation queuing operation.

The operator can manage the washing machine in the server background, view the operation state and an earning report of the washing machine, and modify the related information of the washing machine, for example, modify exhibition information, washing procedure, price, specified time and the like of the washing machine.

If the user is in front of the washing machine, the washing machine is idle and the card swiping module of the washing machine is available, i.e., card swiping information can be received, then after the card swiping module receives first card swiping information of the user, the machine can be reserved personally. The card swiping module notifies a computer board controller of the washing machine to enable the washing machine to enter a reserved state. The computer board controller controls a machine button to be effective (the user can operate the machine button). The user selects the washing procedure through the button, and sets procedure parameters. After setting, the user swipes the card again. Namely, after the card swiping module receives second card swiping information of the user, the fee is deducted according to the price of the procedure selected by the user and the computer board controller of the washing machine is notified to control the washing machine to start operation. Meanwhile, the computer board controller controls the machine button and the card swiping module to be not available, i.e., the operation information of the user is not accepted.

Optionally, a time interval between the second card swiping and the first card swiping is limited, and is 1 to 10 minutes, and may be 3 minutes. Namely, after the user swipes the cards and makes reservation, the user needs to put the clothes into the washing machine within 3 minutes, to select the washing procedure and set the procedure parameters. Then, the user swipes the card again to deduct the fee. After the fee is deducted, the washing machine automatically starts washing. If the operation exceeds 3 minutes, this reservation fails and the washing machine is automatically changed to the idle state.

Scenario 2

A verification step after online reservation of a remote client is added on the basis of the scenario 1, thereby preventing the user from finding a wrong machine after remote reservation and finding that the clothes are put into a wrong machine after payment.

After the remote client succeeds in reserving the washing machine, the user is prompted to find the corresponding machine with the clothes according to a machine number and a placing position; then the user clicks a verification and matching button; the server randomly generates a verification code (target verification information), and sends the verification code (target verification information) to the computer board controller of the washing machine; and the washing machine displays the verification code (target verification information) onto an operation panel of the washing machine after receiving the verification code.

The user acquires the verification code (verification information) displayed in the found washing machine through the terminal, and sends the verification information to the server for verification. If the verification information passes verification, it indicates that the user finds a correct machine and the clothes can be put into the machine. If the verification information fails the verification, the user is prompted that the input verification code is wrong and the user needs to input again or the found machine is wrong and the user needs to find a correct machine again for verification.

Scenario 3

If the user does not have a network payment account or the network speed is bad and not suitable for online payment, then the user can bind an IC card number to the mobile phone client. The server records a binding relationship between the user account and the IC card. When the user selects the card swiping payment during payment, the server sends the card number information (the identifier of the target card) of the IC card of the user to the washing machine; and the washing machine controls the card swiping module of the machine to be available and to only accept card swiping payment information of the IC card. After the fee of the user is successfully deducted through card swiping of the machine, the washing machine automatically starts operation.

After the user binds the card number of the IC card, if the user makes card swiping reservation and card swiping payment through the IC card, then order information is generated on an account of the mobile phone client and the user can view an order state and the operation state of a used washing machine through the mobile phone client. When washing is ended, a reminding message or short message sent by the server can be received.

Embodiment VII

Figure 14:
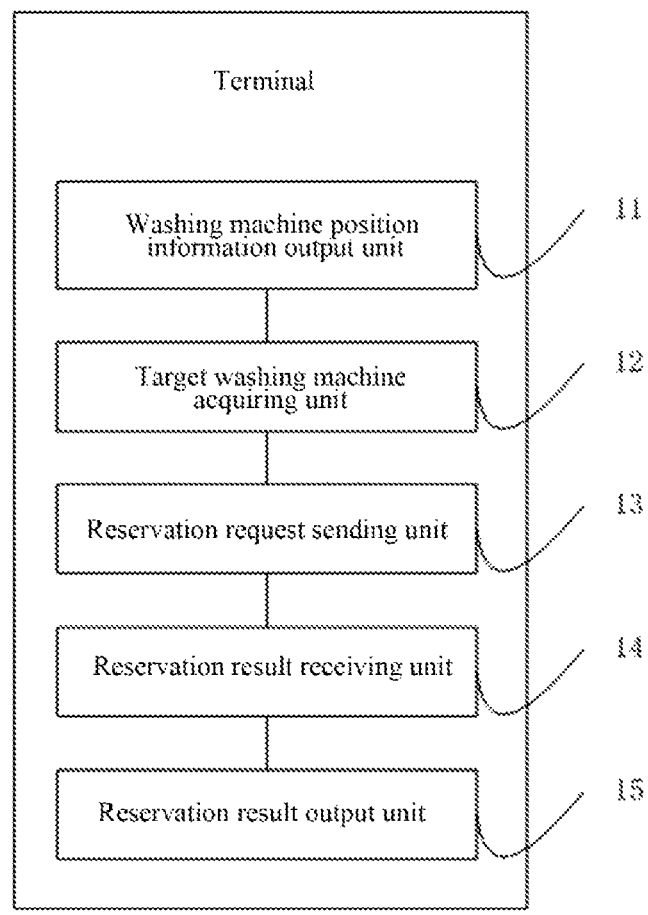
FIG. 14 is a schematic structural diagram illustrating a first terminal in embodiment VII of the present disclosure.

Embodiments of the present disclosure provide a terminal, configured to realize the methods shown in embodiment I and embodiment II. As shown in FIG. 14, the terminal includes:

a washing machine position information output unit 11, configured to output position information and state information of at least one peripheral washing machine;

a target washing machine acquiring unit 12 configured to acquire a target washing machine selected by a user;

a reservation request sending unit 13 configured to send a reservation request to a server, wherein the reservation request includes a target time period and an identifier of the target washing machine input by the user so as to enable the server to schedule the target washing machine to provide a washing function for the user in the target time period;

a reservation result receiving unit 14 configured to receive a reservation result fed back by the server; and a reservation result output unit 15 configured to output the reservation result received by the reservation result receiving unit 14.

Figure 15:
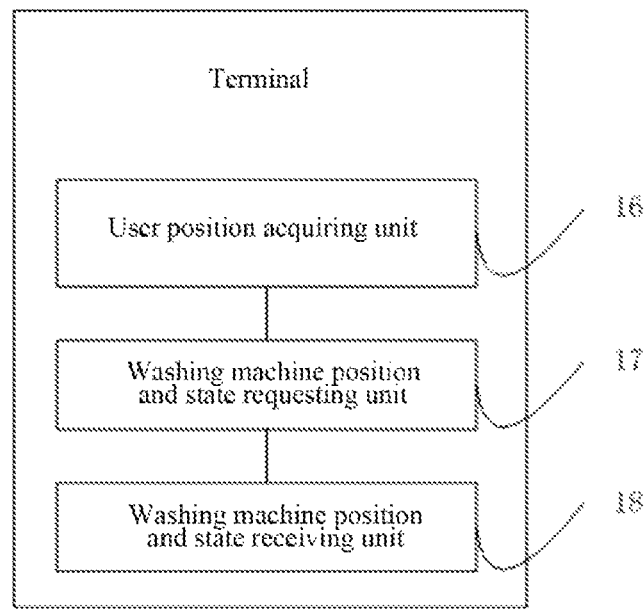
FIG. 15 is a schematic structural diagram illustrating a second terminal in embodiment VII of the present disclosure.

Further, as shown in FIG. 15, the terminal further includes:

a user position acquiring unit 16 configured to acquire the position information of the user;

a washing machine position and state requesting unit 17, configured to send a washing machine position and state acquiring request to the server, wherein the washing machine position and state acquiring request carries position information of the terminal; and a washing machine position and state receiving unit 18, configured to receive washing machine position response information fed back by the server, wherein the washing machine position response information includes position information and state information of at least one washing machine around the user.

Figure 16:
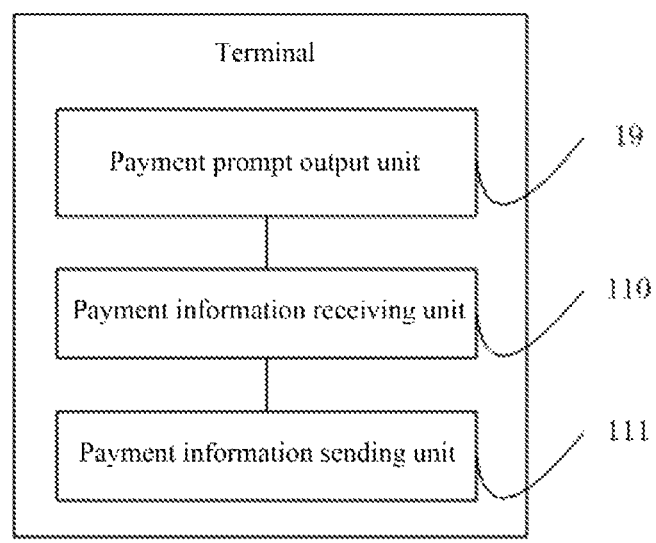
FIG. 16 is a schematic structural diagram illustrating a third terminal in embodiment VII of the present disclosure.

Further, as shown in FIG. 16, the terminal further includes:

a payment prompt output unit 19 configured to output payment prompt information if the user selects online payment;

a payment information receiving unit 110 configured to receive payment information input by the user according to the payment prompt information output by the payment prompt output unit 19; and a payment information sending unit 111 configured to send the payment information received by the payment information receiving unit 110 to the server.

Figure 17:
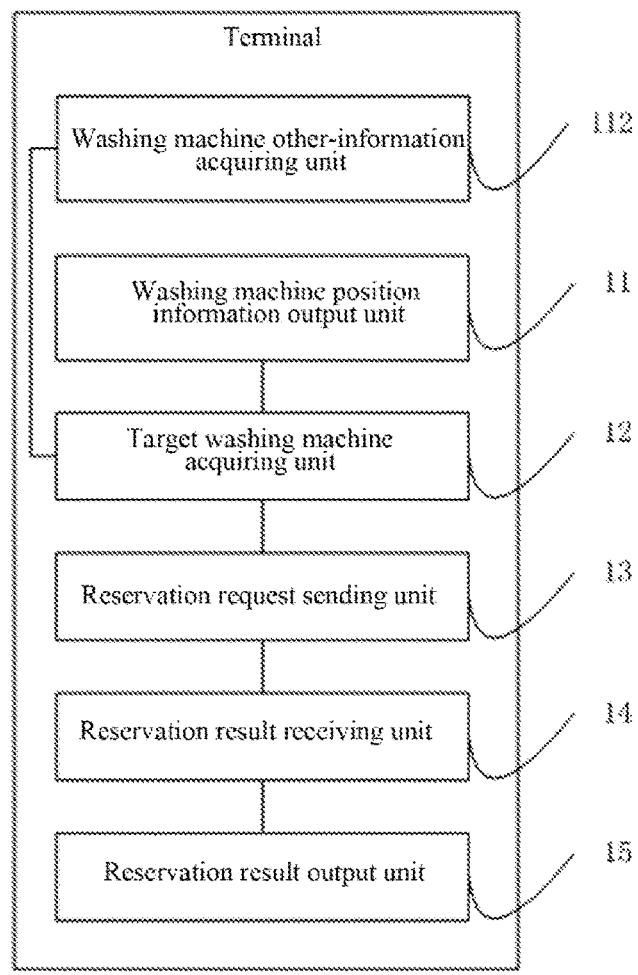
FIG. 17 is a schematic structural diagram illustrating a fourth terminal in embodiment VII of the present disclosure.

Further, as shown in FIG. 17, the terminal further includes:

a washing machine other-information acquiring unit 112, configured to acquire and output at least one of the following information of at least one peripheral washing machine: function information and price information.

Figure 18:
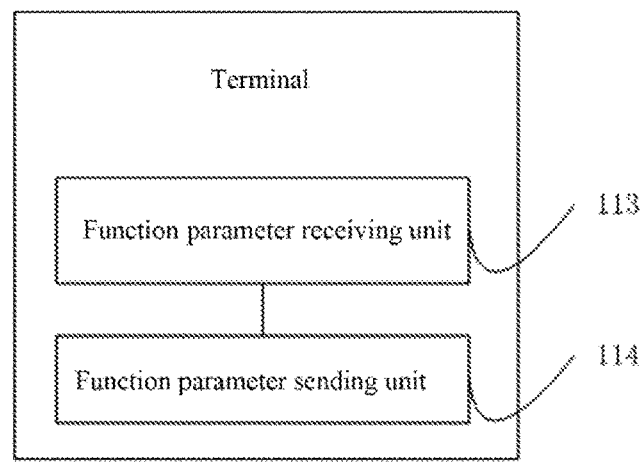
FIG. 18 is a schematic structural diagram illustrating a fifth terminal in embodiment VII of the present disclosure.

Further, as shown in FIG. 18, the terminal further includes:

a function parameter receiving unit 113, configured to receive a function parameter input by the user according to the function information when acquiring and outputting the function information of at least one peripheral washing machine, wherein the function parameter is used for controlling the target washing machine to perform washing; and a function parameter sending unit 114 configured to send the function parameter received by the function parameter receiving unit 113 to the server so as to enable the server to invoke the target washing machine to perform washing according to the function parameters.

Figure 19:
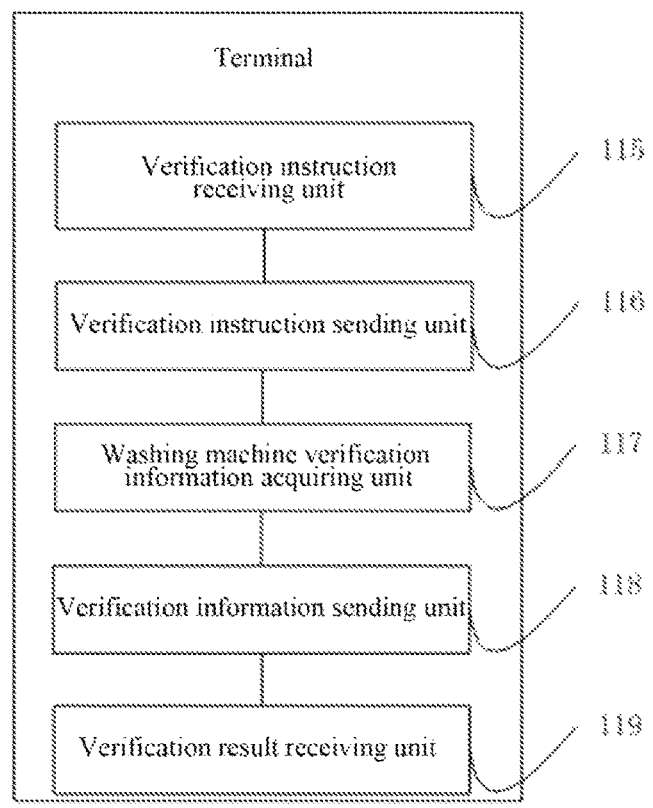
FIG. 19 is a schematic structural diagram illustrating a sixth terminal in embodiment VII of the present disclosure.

Further, as shown in FIG. 19, the terminal further includes:

a verification instruction receiving unit 115 configured to receive a verification instruction sent by the user;

a verification instruction sending unit 116 configured to send the verification instruction to the server so as to enable the server to generate target verification information matched with the target washing machine;

a washing machine verification information acquiring unit 117, configured to acquire the verification information displayed by the washing machine;

a verification information sending unit 118 configured to send the verification information acquired by the washing machine verification information acquiring unit 117 to the server so as to enable the server to verify whether the verification information is matched with the target washing machine; and a verification result receiving unit 119 configured to receive a verification result fed back by the server.

Embodiment VIII

Figure 20:
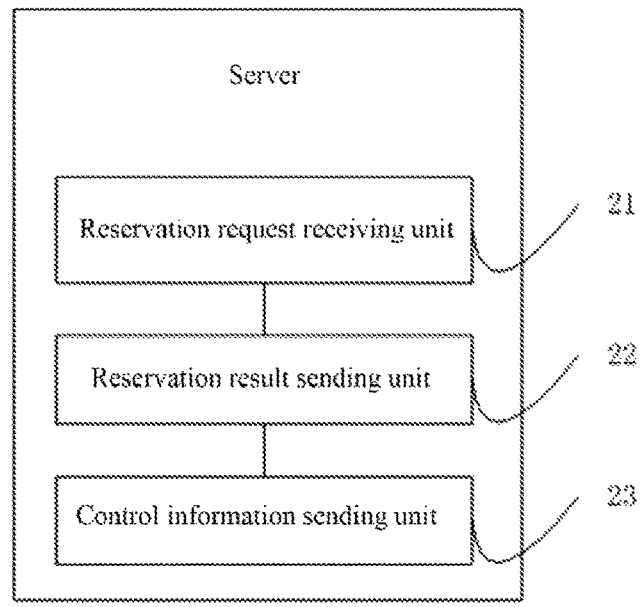
FIG. 20 is a schematic structural diagram illustrating a first server in embodiment VIII of the present disclosure.

Embodiments of the present disclosure provide a server configured to realize the methods shown in embodiment III and embodiment IV. As shown in FIG. 20, the server includes:

a reservation request receiving unit 21 configured to receive a reservation request sent by a terminal, wherein the reservation request includes a target time period and an identifier of the target washing machine input by the user;

a reservation result sending unit 22 configured to send reservation success information to the terminal if the target washing machine is in an idle state in the target time period; and a control information sending unit 23 configured to send the control information to the target washing machine, wherein the control information is used for controlling the target washing machine to provide a washing function for the user in the target time period.

Figure 21:
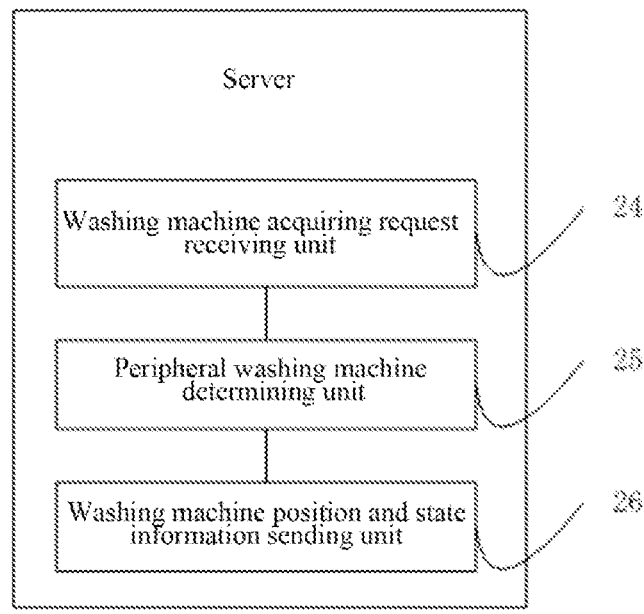
FIG. 21 is a schematic structural diagram illustrating a second server in embodiment VIII of the present disclosure.

Further, as shown in FIG. 21, the server further includes:

a washing machine acquiring request receiving unit 24 configured to receive a washing machine position and state acquiring request sent by the terminal, wherein the washing machine position acquiring request carries position information of the terminal;

a peripheral washing machine determining unit 25 configured to determine position information of at least one washing machine around the terminal according to the position information of the terminal acquired by the washing machine acquiring request receiving unit 24; and a washing machine position and state information sending unit 26, configured to send the position information and the state information of at least one washing machine determined by the peripheral washing machine determining unit 25 to the terminal.

Figure 22:
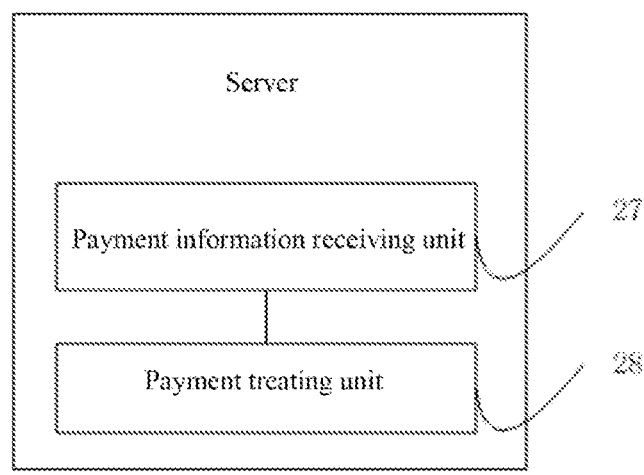
FIG. 22 is a schematic structural diagram illustrating a third server in embodiment VIII of the present disclosure.

Further, as shown in FIG. 22, the server further includes:

a payment information receiving unit 27 configured to receive payment information sent by the terminal if the user selects online payment in the terminal; and a payment treating unit 28 configured to conduct payment treatment according to the payment information received by the payment information receiving unit 27.

Figure 23:
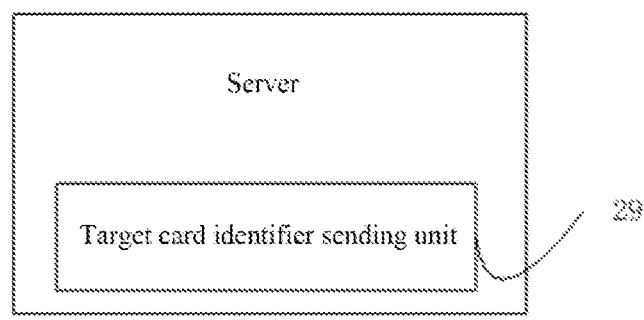
FIG. 23 is a schematic structural diagram illustrating a fourth server in embodiment VIII of the present disclosure.

Further, as shown in FIG. 23, the server further includes:

a target card identifier sending unit 29 configured to send an identifier of a target card associated with the user to the target washing machine if the user selects a card swiping payment mode in the terminal.

Figure 24:
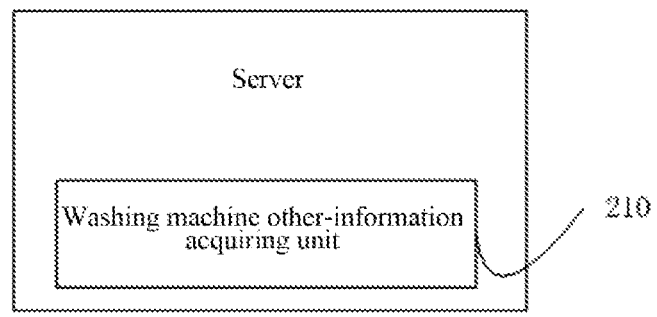
FIG. 24 is a schematic structural diagram illustrating a fifth server in embodiment VIII of the present disclosure.

Further, as shown in FIG. 24, the server further includes:

a washing machine other-information acquiring unit 210, configured to acquire the position information of at least one washing machine in a target region and at least one of the following information: function information and price information.

Figure 25:
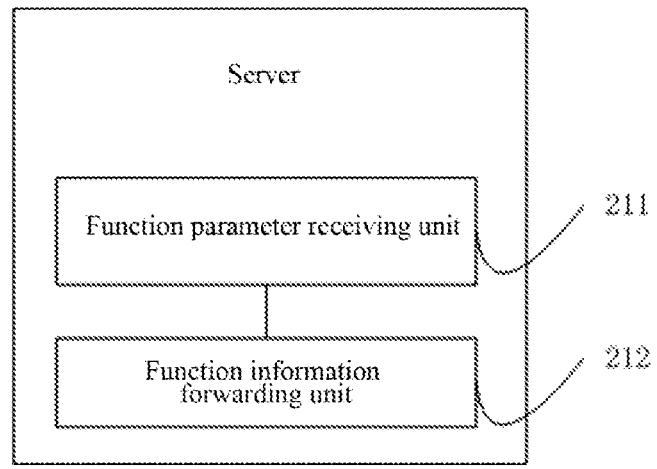
FIG. 25 is a schematic structural diagram illustrating a sixth server in embodiment VIII of the present disclosure.

Further, as shown in FIG. 25, the server further includes:

a function parameter receiving unit 211 configured to receive the function parameters sent by the terminal; and a function information forwarding unit 212 configured to send the function parameters to the target washing machine so as to enable the target washing machine to perform washing according to the function parameters.

Figure 26:
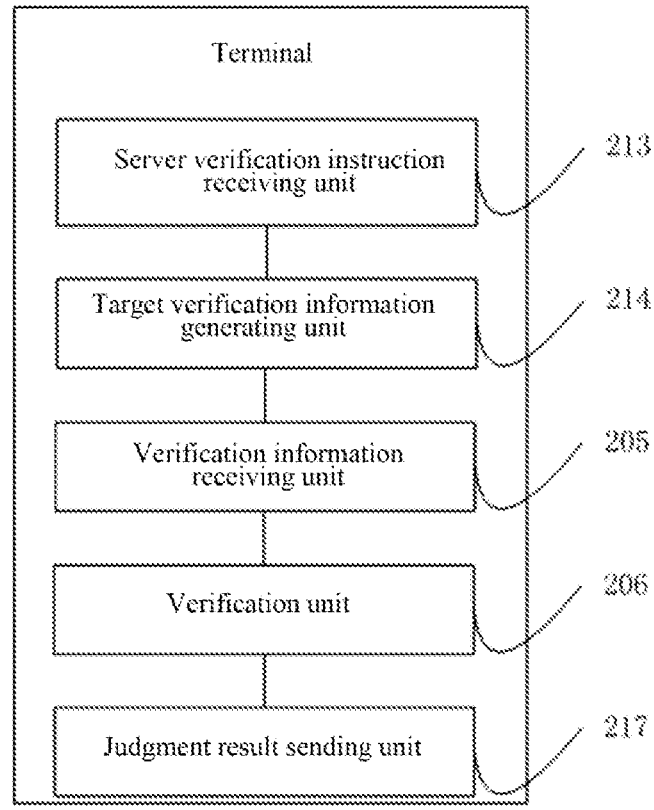
FIG. 26 is a schematic structural diagram illustrating a seventh server in embodiment VIII of the present disclosure.

Further, as shown in FIG. 26, the server further includes:

a server verification instruction receiving unit 213 configured to receive a verification instruction sent by the terminal;

a target verification information generating unit 214 configured to generate target verification information matched with the target washing machine;

a verification information receiving unit 215 configured to receive verification information sent by the terminal;

a verification unit 216 configured to judge whether the verification information is the same as the target verification information; and a judgment result sending unit 217 configured to send a judgment result acquired by the verification unit 216 to the terminal.

Embodiment IX

Figure 27:
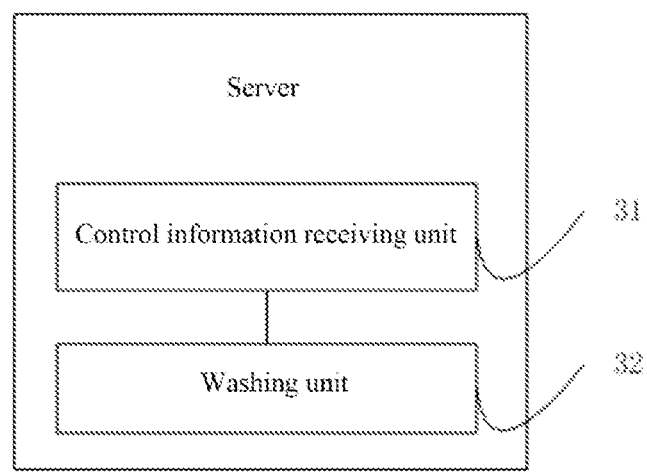
FIG. 27 is a schematic structural diagram illustrating a first washing machine in embodiment IX of the present disclosure.

Embodiments of the present disclosure provide a washing machine configured to realize the methods shown in embodiment V and embodiment VI. The washing machine is a target washing machine and as shown in FIG. 27, includes:

a control information receiving unit 31 configured to receive the control information sent by the server, wherein the control information includes a target time period; and a washing unit 32 configured to wash clothes thrown by the user within the target time period.

Figure 28:
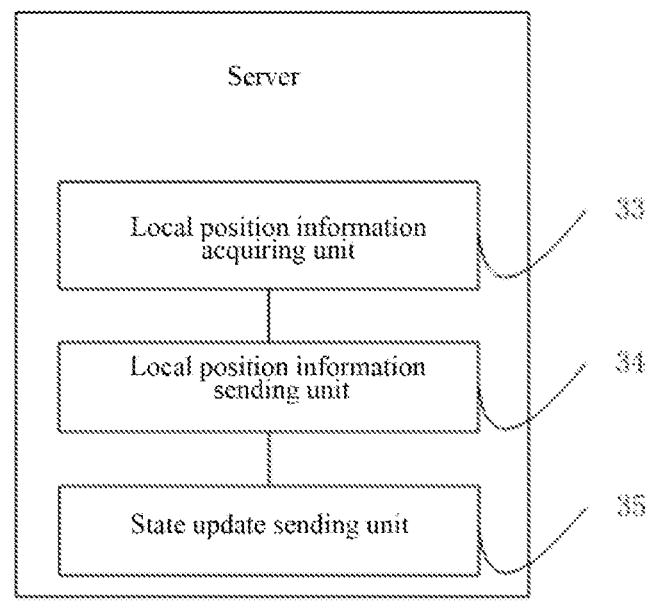
FIG. 28 is a schematic structural diagram illustrating a second washing machine in embodiment IX of the present disclosure.

Further, as shown in FIG. 28, the washing machine further includes:

a local position information acquiring unit 33 configured to acquire local position information;

a local position information sending unit 34 configured to send the position information acquired by the local position information acquiring unit 33 to the server; and a state update sending unit 35 configured to send the changed position information and state information to the server when the operation state of the washing machine is changed.

Figure 29:
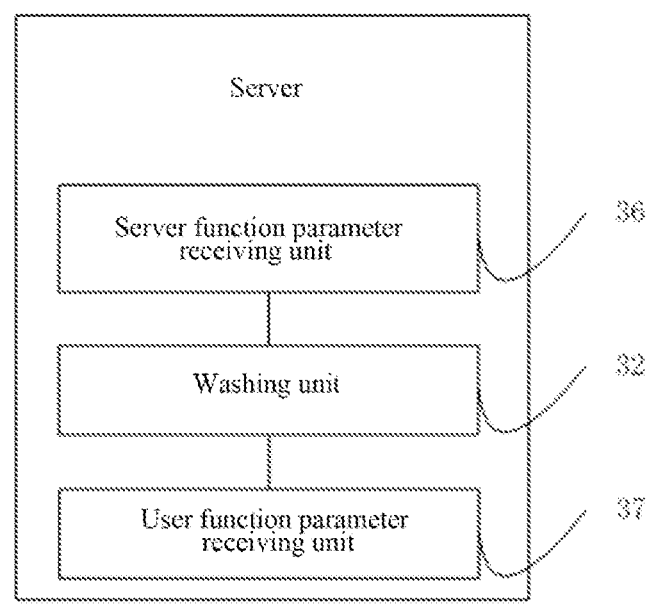
FIG. 29 is a schematic structural diagram illustrating a third washing machine in embodiment IX of the present disclosure.

Further, as shown in FIG. 29, the washing machine further includes:

a server function parameter receiving unit 36 configured to receive function parameters sent by the server.

Correspondingly, the washing unit 32 is further configured to perform washing according to the function parameters.

Optionally, as an alternative mode, the washing machine further includes:

a user function parameter receiving unit 37 configured to receive the function parameters input into the target washing machine by the user.

Correspondingly, the washing unit 32 is further configured to perform washing according to the function parameters.

Figure 30:
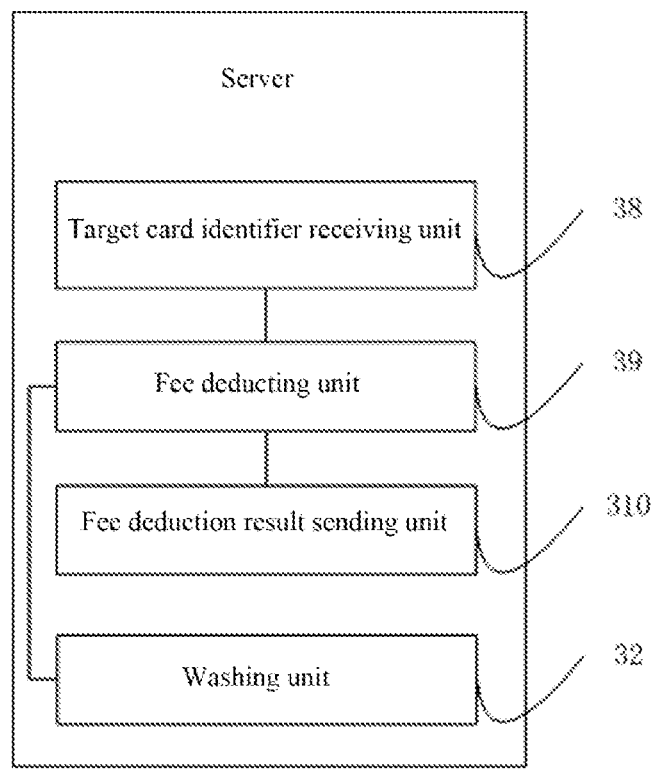
FIG. 30 is a schematic structural diagram illustrating a fourth washing machine in embodiment IX of the present disclosure.

Further, as shown in FIG. 30, the washing machine further includes:

a target card identifier receiving unit 38 configured to receive an identifier of a target card sent by the server;

a fee deducting unit 39 configured to deduct fee from the target card if card swiping information of the target card is detected; and a fee deduction result sending unit 310 configured to send a fee deduction result to the server so as to enable the server to forward a payment result to the terminal.

Correspondingly, the washing unit 32 is further configured to wash the clothes thrown by the user within the target time period if the fee is successfully deducted.

Embodiment X

Figure 31:
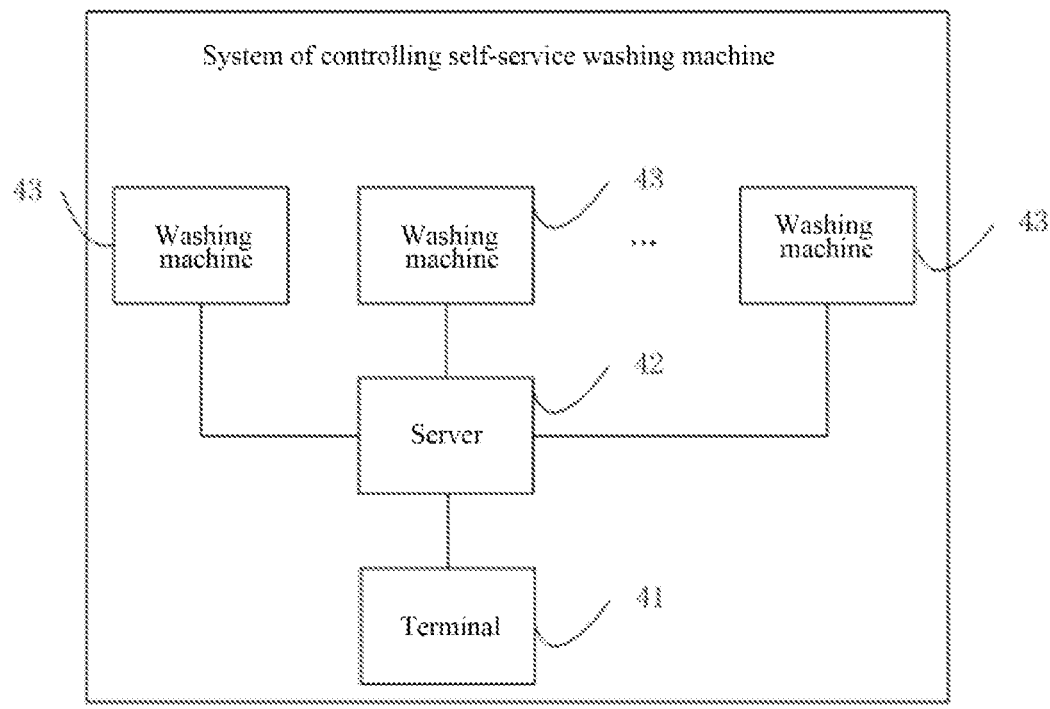
FIG. 31 is a schematic structural diagram illustrating a system of controlling a self-service washing machine in embodiment X of the present disclosure.

Embodiments of the present disclosure provide a system of controlling a self-service washing machine, as shown in FIG. 31, including the terminal 41 shown in embodiment VII, the server 42 shown in embodiment VIII and the washing machine 43 shown in at least one embodiment IX.

It shall be noted that the above contents are only embodiments of the present disclosure and used technical principles. It can be understood for those skilled in the art that the present disclosure is not limited to specific embodiments described herein. For those skilled in the art, the present disclosure can be subject to various apparent variations, readjustments and replacements without departing from a protection scope of the present disclosure. Therefore, although the present disclosure is described in detail through above embodiments, the present disclosure is not only limited to above embodiments. The present disclosure can further include more other equivalent embodiments without deviating from conceptions of the present disclosure. A scope of the present disclosure is determined by a scope of attached claims.

What is claimed is:

1. A method of controlling a self-service washing machine, applied to a terminal, comprising:
    outputting position information and state information of at least one peripheral washing machine;
    acquiring a target washing machine selected by a user;
    sending a reservation request to a server, wherein the reservation request comprises a target time period and an identifier of the target washing machine input by the user so as to enable the server to schedule the target washing machine to provide a washing function for the user in the target time period; and
    receiving and outputting a reservation result fed back by the server;
    the method further comprising the following operations before outputting position information and state information of at least one peripheral washing machine:
    acquiring position information of the user;
    sending a washing machine position and state acquiring request to the server, wherein the washing machine position and state acquiring request carries position information of the terminal; and
    receiving washing machine position and state response information fed back by the server, wherein the washing machine position response information comprises position information and state information of at least one washing machine around the user;
    the method further comprises a plurality of function information of the washing machines, wherein the plurality of function information includes rinsing, drying and steam washing based on time requirement;
    output a reservation control command to the washing machines by the server based on user position, washing machine position and time requirement of the function information.

2. The method of controlling the self-service washing machine according to claim 1, after sending the reservation request to the server, further comprising:
    outputting payment prompt information if the user selects online payment;
    receiving the payment information input by the user according to the payment prompt information; and
    sending the payment information to the server.

3. The method of controlling the self-service washing machine according to claim 1, before sending the reservation request to the server, further comprising:
    acquiring and outputting at least one of following information of at least one peripheral washing machine: function information and price information;

receiving a function parameter input by the user according to the function information when acquiring and outputting the function information of at least one peripheral washing machine, wherein the function parameter is used for controlling the target washing machine to perform washing; and sending the function parameter to the server so as to enable the server to invoke the target washing machine to perform washing according to the function parameter.

4. The method of controlling the self-service washing machine according to claim 3, after receiving and outputting the reservation result fed back by the server, further comprising:

receiving a verification instruction sent by the user;

sending the verification instruction to the server so as to enable the server to generate target verification information matched with the target washing machine;

acquiring verification information displayed by the washing machine;

sending the verification information to the server so as to enable the server to verify whether the verification information is matched with the target washing machine; and receiving a verification result fed back by the server.

5. A terminal, comprising at least one processor and a computer-readable storage medium storing one or more instructions executable by the at least one processor, the one or more instructions comprising:

a washing machine position information output unit, configured to output position information and state information of at least one peripheral washing machine;

a target washing machine acquiring unit configured to acquire a target washing machine selected by a user;

a reservation request sending unit configured to send a reservation request to a server, wherein the reservation request comprises a target time period and an identifier of the target washing machine input by the user so as to enable the server to schedule the target washing machine to provide a washing function for the user in the target time period; a reservation result receiving unit configured to receive a reservation result fed back by the server; and a reservation result output unit configured to output the reservation result received by the reservation result receiving unit;

the one or more instructions further comprising:

a user position acquiring unit, configured to acquire position information of the user;

a washing machine position and state requesting unit, configured to send a washing machine position and state acquiring request to the server, wherein the washing machine position and state acquiring request carries position information of the terminal; and a washing machine position and state receiving unit, configured to receive washing machine position response information fed back by the server, wherein the washing machine position response information comprises position information and state information of at least one washing machine around the user;

the terminal further comprises a plurality of function information of the washing machines, wherein the plurality of function information includes rinsing, drying and steam washing based on time requirement;

output a reservation control command to the washing machines by the server based on user position, washing machine position and time requirement of the function information.

6. The terminal according to claim 5, wherein the one or more instructions further comprise:

a payment prompt output unit configured to output payment prompt information if the user selects online payment;

a payment information receiving unit configured to receive the payment information input by the user according to the payment prompt information output by the payment prompt output unit; and a payment information sending unit configured to send the payment information received by the payment information receiving unit to the server.

7. The terminal according to claim 5, wherein the one or more instructions further comprises:

a washing machine other-information acquiring unit, configured to acquire and output at least one of following information of at least one peripheral washing machine: function information and price information;

a function parameter receiving unit configured to receive a function parameter input by the user according to the function information when acquiring and outputting the function information of at least one peripheral washing machine, wherein the function parameter is used for controlling the target washing machine to perform washing;

a function parameter sending unit configured to send the function parameter received by the function parameter receiving unit to the server so as to enable the server to invoke the target washing machine to perform washing according to the function parameter;

a verification instruction receiving unit configured to receive a verification instruction sent by the user;

a verification instruction sending unit configured to send the verification instruction to the server so as to enable the server to generate target verification information matched with the target washing machine;

a washing machine verification information acquiring unit, configured to acquire verification information displayed by the washing machine;

a verification information sending unit configured to send the verification information acquired by the washing machine verification information acquiring unit to the server so as to enable the server to verify whether the verification information is matched with the target washing machine; and a verification result receiving unit configured to receive a verification result fed back by the server.

8. A system of controlling a self-service washing machine, comprising a terminal, a server and at least one washing machine; wherein the terminal comprises at least one processor and a computer-readable storage medium storing one or more instructions executable by the at least one processor, the one or more instructions comprising:

a washing machine position information output unit, configured to output position information and state information of at least one peripheral washing machine;

a target washing machine acquiring unit configured to acquire a target washing machine selected by a user;

a reservation request sending unit configured to send a reservation request to the server, wherein the reservation request comprises a target time period and an identifier of the target washing machine input by the user so as to enable the server to schedule the target washing machine to provide a washing function for the user in the target time period;
a reservation result receiving unit configured to receive a reservation result fed back by the server; and
a reservation result output unit configured to output the reservation result received by the reservation result receiving unit;
the one or more instructions further comprising:
a user position acquiring unit, configured to acquire position information of the user;
a washing machine position and state requesting unit, configured to send a washing machine position and state acquiring request to the server, wherein the washing machine position and state acquiring request carries position information of the terminal; and
a washing machine position and state receiving unit, configured to receive washing machine position response information fed back by the server, wherein the washing machine position response information comprises position information and state information of at least one washing machine around the user;
the system further comprises a plurality of function information of the washing machines, wherein the plurality of function information includes rinsing, drying and steam washing based on time requirement;
output a reservation control command to the washing machines by the server based on user position, washing machine position and time requirement of the function information.

9. The method of controlling the self-service washing machine according to claim 2, before sending the reservation request to the server, further comprising:
acquiring and outputting at least one of following information of at least one peripheral washing machine: function information and price information;
receiving a function parameter input by the user according to the function information when acquiring and outputting the function information of at least one peripheral washing machine, wherein the function parameter is used for controlling the target washing machine to perform washing; and
sending the function parameter to the server so as to enable the server to invoke the target washing machine to perform washing according to the function parameter.

10. The method of controlling the self-service washing machine according to claim 9, after receiving and outputting the reservation result fed back by the server, further comprising:
receiving a verification instruction sent by the user;
sending the verification instruction to the server so as to enable the server to generate target verification information matched with the target washing machine;
acquiring verification information displayed by the washing machine;
sending the verification information to the server so as to enable the server to verify whether the verification information is matched with the target washing machine; and
receiving a verification result fed back by the server.

11. The terminal according to claim 6, wherein the one or more instructions further comprise:
a washing machine other-information acquiring unit, configured to acquire and output at least one of following information of at least one peripheral washing machine: function information and price information;
a function parameter receiving unit configured to receive a function parameter input by the user according to the function information when acquiring and outputting the function information of at least one peripheral washing machine, wherein the function parameter is used for controlling the target washing machine to perform washing;
a function parameter sending unit configured to send the function parameter received by the function parameter receiving unit to the server so as to enable the server to invoke the target washing machine to perform washing according to the function parameter;
a verification instruction receiving unit configured to receive a verification instruction sent by the user;
a verification instruction sending unit configured to send the verification instruction to the server so as to enable the server to generate target verification information matched with the target washing machine;
a washing machine verification information acquiring unit, configured to acquire verification information displayed by the washing machine;
a verification information sending unit configured to send the verification information acquired by the washing machine verification information acquiring unit to the server so as to enable the server to verify whether the verification information is matched with the target washing machine; and
a verification result receiving unit configured to receive a verification result fed back by the server.

12. The system according to claim 8, wherein the one or more instructions further comprising:
a payment prompt output unit configured to output payment prompt information if the user selects online payment;
a payment information receiving unit configured to receive the payment information input by the user according to the payment prompt information output by the payment prompt output unit; and
a payment information sending unit configured to send the payment information received by the payment information receiving unit to the server.

13. The system according to claim 8, wherein the one or more instructions further comprise:
a washing machine other-information acquiring unit, configured to acquire and output at least one of following information of at least one peripheral washing machine: function information and price information;
a function parameter receiving unit configured to receive a function parameter input by the user according to the function information when acquiring and outputting the function information of at least one peripheral washing machine, wherein the function parameter is used for controlling the target washing machine to perform washing;
a function parameter sending unit configured to send the function parameter received by the function parameter receiving unit to the server so as to enable the server to invoke the target washing machine to perform washing according to the function parameter;
a verification instruction receiving unit configured to receive a verification instruction sent by the user;
a verification instruction sending unit configured to send the verification instruction to the server so as to enable the server to generate target verification information matched with the target washing machine;

a washing machine verification information acquiring unit, configured to acquire verification information displayed by the washing machine;

a verification information sending unit configured to send the verification information acquired by the washing machine verification information acquiring unit to the server so as to enable the server to verify whether the verification information is matched with the target washing machine; and a verification result receiving unit configured to receive a verification result fed back by the server.

* * * * *